United States Patent [19]  [11] 4,136,141
Bauer et al.  [45] Jan. 23, 1979

[54] METHOD OF CUSHIONING COMMODITIES IN CONTAINERS WITH FOAMED IN PLACE CELLULAR PLASTIC MATERIAL

[75] Inventors: Udo Bauer, Nuremberg; Jürgen Nothdurft, Behringersdorf; Willi Langer, Neudorf, all of Fed. Rep. of Germany

[73] Assignee: Klein, Schanzlin & Becker Aktiengesellschaft, Frankenthal, Fed. Rep. of Germany

[21] Appl. No.: 785,116

[22] Filed: Apr. 6, 1977

[30] Foreign Application Priority Data

Apr. 12, 1976 [DE] Fed. Rep. of Germany ....... 2616023

[51] Int. Cl.² ............................................. B29D 27/04
[52] U.S. Cl. ..................... 264/45.2; 53/474; 206/524; 220/444; 264/46.4; 264/275
[58] Field of Search ...................... 264/46.4, 46.6, 275, 264/41, 45.2; 206/524; 220/444; 53/36, 241

[56] References Cited

U.S. PATENT DOCUMENTS

| 2,780,350 | 2/1957 | Simon et al. | 264/275 X |
| 3,222,843 | 12/1965 | Schneider | 220/444 X |
| 3,464,540 | 9/1969 | Stark | 264/41 X |
| 3,485,347 | 12/1969 | McGill et al. | 264/46.6 X |
| 3,641,725 | 2/1972 | Grisell | 264/46.6 X |
| 3,830,895 | 8/1974 | Theodorsen | 53/36 X |
| 3,952,082 | 4/1976 | Arnaud | 264/275 X |

Primary Examiner—Philip Anderson
Attorney, Agent, or Firm—Peter K. Kontler

[57] ABSTRACT

A commodity to be packaged in a carton, box or another type of container is foamed in place while being held by distancing elements which extend into the interior of the container. The distancing elements are retracted upon completion of the foaming step, either through the open top or through openings in the top, bottom and/or side walls of the container.

10 Claims, 11 Drawing Figures

METHOD OF CUSHIONING COMMODITIES IN CONTAINERS WITH FOAMED IN PLACE CELLULAR PLASTIC MATERIAL

BACKGROUND OF THE INVENTION

The present invention relates to a method of cushioning commodities to be packaged or crated by cellular plastic material which is foamed in place around the commodities in cartons, boxes or other types of containers.

An advantage of foamed-in-place cushions in the packaging field is that a commodity which is surrounded by such cushioning or padding means (which, in turn, is confined in a container) is adequately shielded against shocks at all sides which are surrounded by foamed plastic material. This is due to the fact that foaming in place causes the cellular plastic material to fill the space or spaces between the external surface of the commodity and the internal surface of the container.

In accordance with a presently known packaging technique which resorts to foamed-in-place cushioning materials, a flexible hose or an analogous envelope for the constituents of cellular plastic material is inserted into a container prior to insertion of the commodity to be packaged. The envelope is sealed and the confined material is caused or allowed to foam. When the foamed material reaches the desired stability (but prior to completion of the foaming step), the commodity to be packaged is placed onto such foamed material and a second envelope (again containing the constituents of cellular plastic material) is placed on top of the commodity. The second envelope is thereupon closed and the container is also closed. The foaming of material in both envelopes is completed while the container is closed whereby such material forms a composite cushion which fills or substantially fills the space between the commodity and the container.

The just described conventional procedure exhibits several serious drawbacks. Thus, a certain interval of time must elapse between the insertion of the first envelope and the insertion of a commodity to be packaged because the foamed material in the first envelope must acquire a certain stability which suffices to insure that such material will maintain the inserted commodity at an optimum distance from the bottom wall of the container. Moreover, the insertion of a commodity on top of the material in the first envelope must be timed with utmost care because premature insertion results in excessive flattening of the material in the first envelope whereas delayed insertion enables the cushion below the inserted commodity to assume a condition in which it maintains the commodity too close to the cover, i.e., the second cushion in the envelope on top of the commodity is not permitted to acquire an optimum thickness. Still further, the just described procedure often results in lateral shifting of inserted commodities. In order to insure satisfactory cushioning of commodities (e.g., sensitive pumps, valves or the like and/or their parts), the operation must be controlled by highly skilled and reliable attendants.

It is also known to utilize prefabricated cushions which are placed onto the bottom wall of the container prior to insertion of the commodity. The next-following part of the packaging operation is carried out in the same way as described above, i.e., an envelope containing the constituents of cellular plastic material is placed on top of the commodity, the container is closed and the foaming in place proceeds in order to obtain a second cushion which fills the space around the commodity at a level above the prefabricated bottom cushion. The just described procedure exhibits the advantage that the commodity is more likely to be located in the optimum position. However, the cost of packaging is much higher because of the need for prefabricated cushions as well as for facilities in which the prefabricated cushions are stored. Also, the cushioning or padding effect of a prefabricated cushion is often quite different from the effect of a cushion which is foamed in place so that the commodity which is confined between a prefabricated cushion and a foamed-in-place cushion is likely to change its position and/or orientation during transport and/or other manipulation of the container. Therefore, it is customary to employ auxiliary equipment which insures (or is intended to insure) retention of the commodity in an optimum position. The provision of auxiliary equipment contributes to the cost of the packaging operation. Still further, the hardness of a prefabricated cushion must be selected in dependency on the weight of the commodity to be supported thereby because such prefabricated cushion supports the entire commodity in the course of the packaging operation. This means that, if the weight of commodities to be packaged is not uniform, it is necessary to furnish an assortment of prefabricated cushions each of which exhibits a different resistance to deformation under weight.

OBJECTS AND SUMMARY OF THE INVENTION

An object of the invention is to provide a novel and improved method of cushioning commodities in cartons, boxes or analogous containers by cellular plastic material which is foamed in place.

Another object of the invention is to provide a method which insures that the consistency of the entire cushion is uniform at all stages of foaming as well as subsequent to completion of the foaming step.

A further object of the invention is to provide a method which can be carried out by resorting to simple instrumentalities, which can be completed within a short interval of time, and which can be practiced in connection with packaging of relatively heavy, lightweight, bulky or small commodities.

An additional object of the invention is to provide a method which insures that the quality of the foamed-in-place cushion is not affected by the lack of skill and/or conscientiousness of attendants, and which can be resorted to for reproducible packaging of long series of identical or different commodities.

Still another object of the invention is to provide a method which insures satisfactory and reproducible packaging of commodities having a regular or a highly irregular shape, and which can be practiced in connection with the packaging of discrete commodities (i.e., one commodity per container) or in connection with simultaneous packaging of two or more commodities in a common container.

The invention resides in the provision of a method of cushioning commodities (e.g., relatively heavy and bulky metallic parts) in cartons, boxes or analogous containers. The method comprises the steps of introducing a commodity into an empty container, supporting the commodity from the outside of the container in a predetermined position in which at least a substantial portion of the external surface (but preferably the entire external surface) of the commodity is spaced apart from the internal surface of the container, introducing the constituents of a cellular plastic material between the internal and external surfaces (preferably in a deformable envelope), foaming the thus introduced constituents in place so that the resulting cushion at least substantially fills the space between the internal and external surfaces, and terminating the supporting step when the cushion is sufficiently stable to maintain the commodity in the predetermined (optimum) position.

The supporting step may include maintaining the commodity in suspended position and/or propping the commodity from below and/or from one or one sides.

If the container is of the type one or more openings (such openings may be provided in the bottom wall, side walls and/or top wall or walls of the container), the supporting step preferably comprises maintaining the commodity in the interior of the container in contact with one or more distancing elements which extend through the openings of the container and are retracted when the cushion is stable enough to maintain, by itself, the commodity in the optimum position.

The novel features which are considered as characteristic of the invention are set forth in particular in the appended claims. The improved method itself, however, together with additional features and advantages thereof, will be best understood upon perusal of the following detailed description of certain specific embodiments of apparatus for the practice of the method with reference to the accompanying drawing.

DESCRIPTION OF THE PREFERRED EMBODIMENTS

Figure 1:
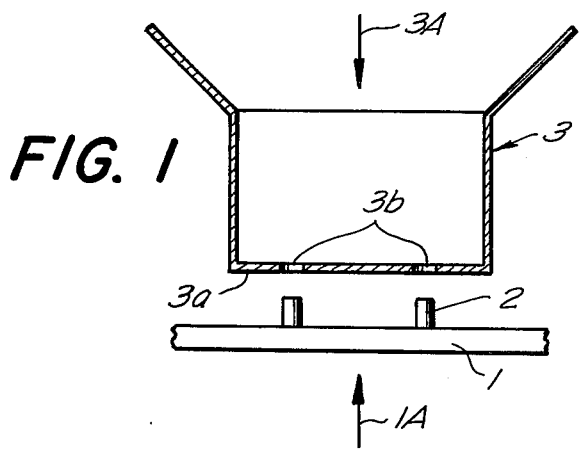
FIG. 1 is a somewhat schematic elevational view of a portion of a first apparatus, an empty container being shown in section at a level above the apparatus.
Figure 2:
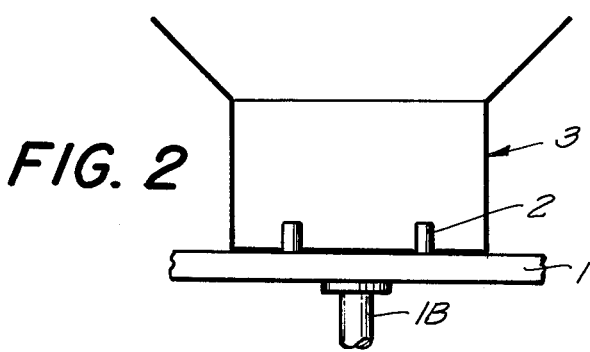
FIG. 2 illustrates the structure of FIG. 1 but with the container (which is shown in a simplified sectional view) in operative position on a plate-like carrier of the apparatus.

Referring to FIG. 1, there is shown a plate-like carrier 1 for several pin-shaped distancing elements or locating means 2. The container 3 (e.g., a cardboard box) has a bottom wall 3a with openings or holes 3b in register with the elements 2. When the container 3 is moved downwardly (arrow 3A) and/or the carrier 1 is moved upwardly (arrow 1A), the distancing elements 2 enter the interior of the container to an exact which is determined by their length and the thickness of the bottom wall 3a. This is shown in FIG. 2. The introduction of distancing elements 2 into a container 3 can be carried out manually or automatically. The means for moving the carrier 1 up and down may comprise a fluid-operated motor whose piston rod is shown at 1B.

Figure 3:
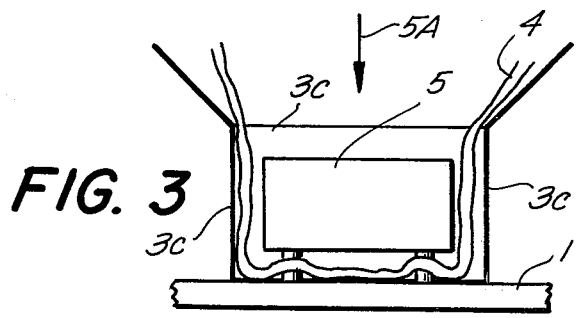
FIG. 3 shows the structure of FIG. 2, with a commodity inserted into the container, together with an envelope for the constituents of a cellular plastic material.

FIG. 3 shows a flexible envelope 4 which is inserted into the container 3 while the latter rests on the carrier 1. The commodity 5 to be cushioned and packaged can constitute a block-shaped item which is placed onto the distancing elements 2 by moving it in the direction indicated by arrow 5A so that the commodity is located at a predetermined distance from the bottom wall 3a. If desired, the underside of the commodity 5 may be formed with shallow sockets (not shown) for the upper end portions of the distancing elements 2 so that such elements can determine the distance between the bottom wall 3a and the underside of the commodity as well as between the side walls 3c of the container and the respective sides or surfaces of the commodity. The length of the envelope 4 is preferably sufficient to insure that it can be draped all the way around the commodity 5.

Figure 4:
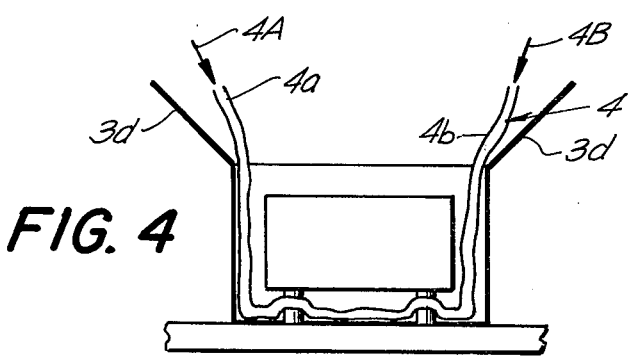
FIG. 4 illustrates the structure of FIG. 3 and the step of introducing the constituents of plastic material into the envelope.
Figure 5:
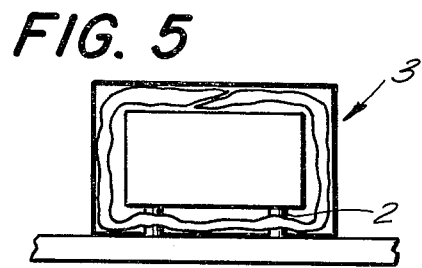
FIG. 5 shows the structure of FIG. 1 but with the container in closed position and with the foaming step in progress.

The constituents of cellular plastic material which is to expand in the envelope 4 are introduced in the directions indicated by arrows 4A and 4B (see FIG. 4). The end portions 4a, 4b of the envelope 4 are thereupon sealed and the envelope is draped around the commodity 5 in a manner as shown in FIG. 5. The flaps 3d of the top wall or cover of the container 3 are moved to closed positions (as shown in FIG. 5) and can be sealed, e.g., by tape, cord or in another suitable way.

Figure 6:
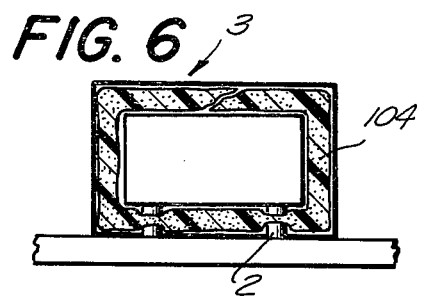
FIG. 6 shows the structure of FIG. 5 upon completion of the foaming step.
Figure 7:
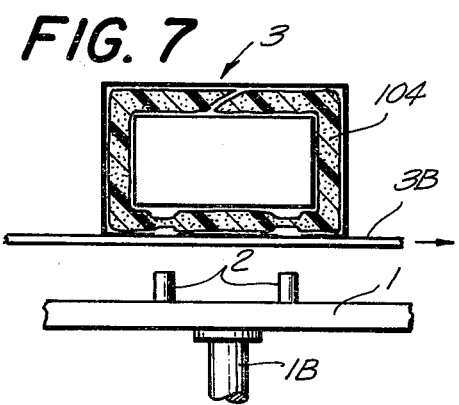
FIG. 7 shows the structure of FIG. 6 but with the container separated from the carrier.

When the forming in place is completed (see FIG. 6), the resulting cushion 104 surrounds the entire commodity 5 from all sides and, when the formed material sets, the commodity is properly cushioned against any and all shocks which are anticipated during further manipulation of the filled container 3. The filled and closed container 3 is thereupon moved away from the carrier 1 (or vice versa) so that the distancing elements 2 are withdrawn from the interior of the container. This is shown in FIG. 7. The container 3 is moved away from the carrier 1 when the stability of cellular material which forms the cushion 104 is sufficiently high to insure that the commodity 5 will remain in the optimum position with respect to the walls of the container 3 even if it is not supported by the distancing elements 2.

The separation of a filled and closed container 3 from the carrier 1 can be effected by hand (depending on the weight of the filled container) or automatically. For example, the apparatus may comprise suitable means (e.g., one or more belt conveyors or other types of conveyors) for moving the carrier up and down, and/or a ramp or a wedge along which the filled container is caused to slide as soon as the distancing elements 2 are retracted. Also, the container can be supported by pairs of endless conveyor belts 3B (one shown in FIG. 7) which provide room for engagement of the upper side of the carrier 1 with the underside of the bottom wall 3a when the motor including the piston rod 1B raises the carrier 1 to the level of FIGS. 2-6.

FIGS. 3 to 5 show that the envelope 4 is located in front of the illustrated distancing elements 2. If desired, the container 3 can receive two envelopes, one in front and one behind the distancing elements 2. If the distancing elements form two or more rows (e.g., if the carrier 1 supports four distancing elements 2, two nearer to and two remote from the observer of FIG. 3), a first envelope can be placed in front of the two front elements 2, a second envelope between the front and rear elements 2, and a third envelope behind the rear elements 2. However, by properly selecting the dimensions of a single envelope and the constituents of cellular plastic material, such single envelope will suffice to insure that the foamed-in-place material will fill the entire space between the external surface of the commodity and the internal surface of the container.

Figure 8:
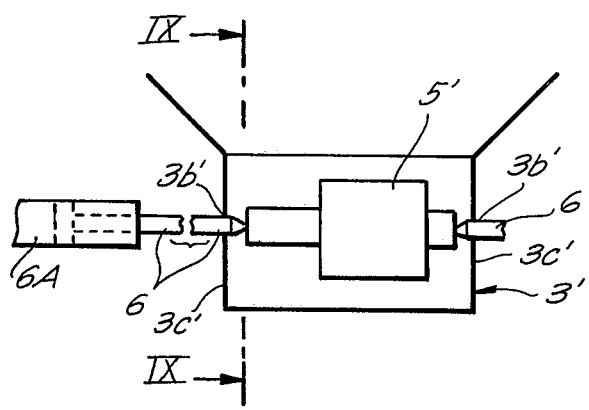
FIG. 8 is a schematic sectional view of a container with a commodity therein, and further showing a portion of a modified apparatus which can support two opposite sides of the inserted commodity.
Figure 9:
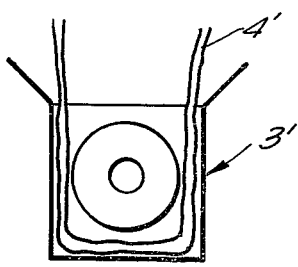
FIG. 9 is a schematic transverse vertical sectional view as seen in the direction of arrows from the line IX—IX of FIG. 8, further showing an envelope for the constituents of cellular plastic material.

FIGS. 8 and 9 show a second embodiment wherein a substantially cylindrical commodity 5' is held in an optimum position by means of distancing elements 6 in the form of centers which can engage the adjacent end faces of the commodity in the container 3'. The side walls 3c' od the container 3' have openings 3b' through which the distancing elements 6 extend when they engage the commodity 5'.

The manner is which the envelope 4' is inserted into the container 3' and filled with the constituents of cellular plastic material is preferably the same as described in connection with FIGS. 1 to 7. It is clear that a commodity 5 or 5' can be properly located by resorting to several types and sets of distancing elements, e.g., to the elements 2 and 6. This invariably insures that the commodity is held in an optimum position, i.e., at a requisite distance from the bottom and top walls as well as from the side walls of the container.

The distancing elements 6 of FIG. 8 can be moved into and from engagement with commodities 5' by electromagnets, fluid-operated motors or the like. FIG. 8 shows a portion of a double-acting cylinder 6A which has a piston rod constituting the respective distancing element 6.

Figure 10:
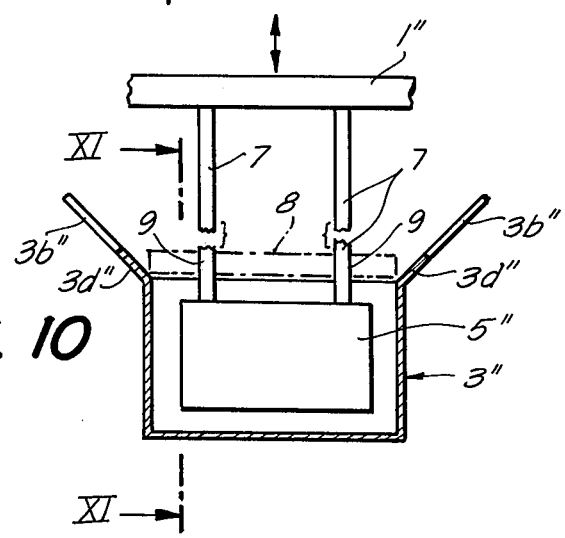
FIG. 10 is a schematic sectional view of a container with a commodity therein, and further showing a portion of a third apparatus which can hold the commodity in suspended portion prior to and in the course of the foaming step.
Figure 11:
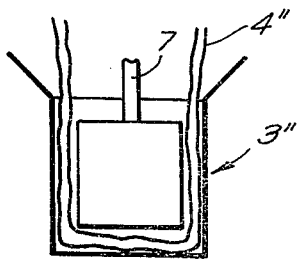
FIG. 11 is a transverse vertical sectional view as seen in the direction of arrows from the line XI—XI of FIG. 10, further showing an envelope for the constituents of cellular plastic material.

FIGS. 10 and 11 illustrate a further embodiment. The commodity 5" to be packaged is suspended on one, two or more distancing elements 7 which are movable up and down and are suspended on a suitable carrier 1". When the foaming-in-place is completed, the distancing elements 7 are withdrawn through suitably configurated and dimensioned openings 3b" in the flaps 3d" of the cover or top wall of the container 3".

If desired, the structure which is shown in FIGS. 10 and 11 can be used for positioning of commodities in containers which need not have any openings for the distancing elements 7. This can be achieved by using a temporary top wall or lid 8 (indicated in FIG. 10 by phantom lines) which is placed at a requisite distance above the commodity 5" while the flaps 3d" remain in open positions. The lid 8 has openings 9 for the distancing elements 7 and is movable up and down along such distancing elements. When the foaming in place below the lid 8 is completed, the latter is lifted together with the distancing elements 7 and the flaps 3d" are pivoted to closed positions. The distancing elements 7 may constitute magnets or they may constitute or include suction cups for separably holding the commodity 5" in suspended position.

The exact nature of the constituents which can be introduced into the envelope 4, 4' or 4" forms no part of the present invention. By way of example, the cellular material may constitute a rigid or flexible urethane foam, i.e., reaction products of a polyol and a polyisocyanate made to rise and foam by a blowing agent, e.g., $CO_2$ gas or a fluorocarbon. The reaction by which urethane foams are produced can constitute a one-shot method, a prepolymer method or a quasi-prepolymer method. Silicone, polystyrene, polyethylene, vinyl and other foams can be used with equal advantage, at least for the packaging of certain types of commodities. The cushion may have open or closed cells.

The improved method exhibits a number of important advantages. Thus, the foamed cushion is homogeneous throughout and its resistance to shifting or changes in orientation of the confined commodity is uniform in each and every direction. Since the foaming of material in the envelope 4, 4' or 4" takes place in a single step, the density of each and every portion of the cushion is the same, and such density can be readily selected in advance by appropriate selection of the constituents and their quantities. The distancing elements invariably insure that the commodity in the interior of the container remains in the selected predetermined (optimum) position prior to and in the course of the foaming step. Also, the making of holes or openings (if necessary) in the walls of the container presents no problems; such openings can be formed subsequent to making of the container or in a blank which is thereupon converted into a container. For example, if the container consists of cardboard, the holes or openings can be stamped simultaneously with stamping of the respective blank from a larger piece of cardboard. Finally, the packaging operation requires only a small fraction of the time which is needed for completion of packaging with foamed-in-place cushioning material in accordance with heretofore known procedures. In fact, the packaging of two commodities in accordance with the method of the present invention can be completed within an interval of time which is needed to complete the packaging of a single commodity in accordance with presently known techniques.

The improved method is susceptible of many additional modifications without departing from the spirit of the invention. For example, two or more commodities can be confined in one and the same container. This merely necessitates a slightly different design of the apparatus, i.e., the distancing elements must be configurated and distributed in such a way that they can support two or more commodities in optimum positions in the interior of a single container.

Without further analysis, the foregoing will so fully reveal the gist of the present invention that others can, by applying current knowledge, readily adapt it for various applications without omitting features that, from the standpoint of prior art, farily constitute essential characteristics of the generic and specific aspects of our contribution to the art and, therefore, such adaptations should and are intended to be comprehended within the meaning and range of equivalence of the claims.

What is claimed is:

1. A method of cushioning commodities in cartons, boxes or analogous prefabricated containers, comprising the steps of introducing a commodity into an empty prefabricated container; supporting the commodity from the outside of the container by at least one distancing element which extends into the container to maintain the commodity in a position in which at least a substantial portion of the external surface of the commodity is spaced apart from the internal surface of the container; introducing the foamable constituents of a cellular plastic material between said surfaces; foaming the thus introduced constituents in place so that the resulting cushion at least substantially fills the space between said surfaces; and terminating said supporting step when the cushion is sufficiently stable to maintain the commodity in said position, said terminating step including withdrawing the distancing element from the container.

2. A method as defined in claim 1, wherein said supporting step includes maintaining the commodity in suspended position on the distancing element.

3. A method as defined in claim 1, wherein each prefabricated container has a bottom wall with at least one opening therein and said supporting step includes propping the commodity from below, said propping step comprising inserting the distancing element into the container through the opening in the bottom wall and placing the commodity onto the thus inserted distancing element.

4. A method as defined in claim 1, further comprising the step of placing a deformable envelope into said space, introducing said constituents into the envelope, sealing the envelope, and draping the envelope around the commodity prior to completion of said foaming step.

5. A method as defined in claim 1, further comprising the step of closing the container prior to completion of said foaming step.

6. A method as defined in claim 1, wherein each prefabricated container has at least one opening and said supporting step comprises maintaining the commodity in the interior of the container in contact with said distancing element while the distancing element extends through the opening of the container.

7. A method as defined in claim 4, wherein said containers include side walls and said openings are provided in the side walls of the containers.

8. A method as defined in claim 4, wherein each container has an open top and a closure for said open top, said openings being provided in said closures and each closure overlying the open top of the respective container in the course of said foaming step.

9. A method of cushioning commodities in cartons, boxes or analogous containers of the type having at least one opening, comprising the steps of introducing a commodity into an empty container; supporting the commodity from the outside of the container in a position in which at least a substantial portion of the external surface of the commodity is spaced apart from the internal surface of the container, said supporting step comprising inserting at least one distancing element into and through said opening of the container so that the distancing element extends into the container; introducing the foamable constituents of a cellular plastic material between said surfaces; foaming the thus introduced constituents in place so that the resulting cushion at least substantially fills the space between said surfaces; maintaining the commodity in contact with the distancing element in the course of said introducing and foaming steps; and terminating said supporting step when the cushion is sufficiently stable to maintain the commodity in said position.

10. A method as defined in claim 9, wherein at least one of said inserting and terminating steps includes moving the distancing element relative to the container.

* * * * *